United States Patent Office.

THERON R. SHERRY, OF NEWARK, NEW JERSEY.

Letters Patent No. 109,769, dated November 29, 1870.

IMPROVEMENT IN FILLINGS FOR WOOD.

The Schedule referred to in these Letters Patent and making part of the same.

I, THERON R. SHERRY, of Newark, county of Essex and State of New Jersey, have invented a certain Composition, of which the following is a specification.

The nature of my invention consists in so combining a number of materials with linseed-oil as to produce a wood-filler and cement which may be used on all kinds of wood or metals, but more particularly on houses, railroad-cars, carriages, sleighs, steamboats, and all sailing-vessels; and is composed of linseed-oil, India rubber, sugar of lead, whiting, raw umber, and red lead.

A portion of these articles are boiled in the oil and the remainder added afterward, and the whole reduced to the proper consistency with turpentine.

In carrying out my invention I take of the ingredients in about the following proportions, say:

To one gallon of linseed-oil I add about one ounce of India rubber, (pure gum,) one ounce of raw umber, one ounce of red lead, one-half pound sugar of lead, and three pounds of whiting.

The India rubber should be well washed and cut into small pieces, and first boiled in the oil, say from about two to five hours; then add the raw umber and red lead, and boil them about the same length of time, after which the whole is allowed to cool and settle.

It is then poured into a can prepared for the purpose, care being had not to agitate the settlings. The sugar of lead and the whiting are then mixed with oil and ground in a suitable paint-mill. The whole is then mixed together and reduced with turpentine to the desired consistency.

The red lead, sugar of lead, and umber are used more particularly as a drier.

This composition, if properly compounded, makes, in my judgment, the best wood-filler and cement that has ever been produced, and for painting carriages, wagons, sleighs, and the like, is unsurpassed, as it not only fills the grain of the wood far better than lead, but it adheres to and preserves the wood much better, and, at the same time, works freer and costs less.

The present mode of painting carriages and the like involves a great amount of labor, as it requires from eight to twelve coats of lead, and (what is termed rough-stuff,) each coat to be properly rubbed and sand-papered before the body is ready for the final color, while, by the use of my invention, the body needs but two coats of the "filling," two coats of lead, and one coat of rough-stuff, to prepare it for the color, and makes a far better and more durable piece of work, and requires but about one-half the time that is consumed by the old process.

What I claim as new, and desire to secure by Letters Patent, is—

1. The improved filler for wood, composed of linseed-oil, India rubber, red lead, and raw umber, compounded in the manner and about in the proportion herein set forth.

2. The improved filler for wood, composed of India rubber, sugar of lead, whiting, and linseed-oil, compounded in the manner and about in the proportion herein set forth.

3. The improved filler for wood, composed of red lead, linseed-oil, India rubber, and whiting, compounded in the manner and about in the proportions herein set forth.

4. The improved filler of wood, composed of linseed-oil, India rubber, raw umber, red lead, sugar of lead, and whiting, compounded in the manner and about in the proportions herein specified.

THERON R. SHERRY.

Witnesses:
 OLIVER DRAKE,
 SAML. MORROW, Jr.